US009868268B2

(12) United States Patent
Hoffman

(10) Patent No.: US 9,868,268 B2
(45) Date of Patent: Jan. 16, 2018

(54) MAGNETIC CLASPS FOR INSULATION

(71) Applicant: Hydra Heating Industries, LLC, Atlanta, GA (US)

(72) Inventor: Michael Hoffman, Atlanta, GA (US)

(73) Assignee: Hydra Heating Industries, LLC., Atlanta, GA (US)

( * ) Notice: Subject to any disclaimer, the term of this patent is extended or adjusted under 35 U.S.C. 154(b) by 0 days.

(21) Appl. No.: 15/229,888

(22) Filed: Aug. 5, 2016

(65) Prior Publication Data

US 2017/0037614 A1 Feb. 9, 2017

Related U.S. Application Data

(60) Provisional application No. 62/202,114, filed on Aug. 6, 2015.

(51) Int. Cl.
| | |
|---|---|
| B32B 7/08 | (2006.01) |
| E04C 2/284 | (2006.01) |
| E04C 2/38 | (2006.01) |
| E04B 2/00 | (2006.01) |
| E04B 1/90 | (2006.01) |
| E04B 2/74 | (2006.01) |

(52) U.S. Cl.
CPC .............. *B32B 7/08* (2013.01); *E04B 1/90* (2013.01); *E04C 2/284* (2013.01); *E04C 2/38* (2013.01); *E04C 2/46* (2013.01); *B32B 2255/00* (2013.01); *B32B 2307/206* (2013.01); *E04B 2/7457* (2013.01)

(58) Field of Classification Search
CPC . B32B 7/08; B32B 2255/00; B32B 2307/206; E04B 1/74; E04B 1/90; E04B 2/284; E04B 2/38; E04B 2/46; E04C 2/284; E04C 2/38; E04C 2/46
See application file for complete search history.

(56) References Cited

U.S. PATENT DOCUMENTS

| | | | |
|---|---|---|---|
| 1,715,044 A * | 5/1929 | Reiter | A44B 17/0017 24/103 |
| 2,192,643 A * | 3/1940 | Kennedy | A47C 21/022 24/710.4 |
| RE23,636 E | 3/1953 | Wilson | |
| 2,649,330 A | 8/1953 | Schamel | |
| 2,742,250 A * | 4/1956 | Cronberger | A47G 1/17 24/303 |
| 2,880,015 A | 3/1959 | Harben | |
| 2,932,545 A * | 4/1960 | Foley | E05C 19/16 206/818 |
| 2,959,832 A | 11/1960 | Baermann | |
| 3,041,694 A * | 7/1962 | Hansen | A47C 31/026 24/103 |
| 3,086,247 A | 4/1963 | Rubens | |
| 3,095,668 A | 7/1963 | Dorsett | |

(Continued)

*Primary Examiner* — James Ference
(74) *Attorney, Agent, or Firm* — Thomas Horstemeyer, LLP

(57) ABSTRACT

Various insulations that employ magnetic clasps are disclosed herein. Insulation is formed as a panel of an insulation material. A magnetic clasp is attached to the panel. The magnetic clasp has a magnetic component that is substantially flush with a face of the panel. The magnetic component comprises a mixture of a ferromagnetic material and the insulation material.

16 Claims, 2 Drawing Sheets

(56) References Cited

U.S. PATENT DOCUMENTS

| | | | |
|---|---|---|---|
| 3,111,728 A * | 11/1963 | Alderfer | E05C 19/161 |
| | | | 264/104 |
| 3,112,163 A * | 11/1963 | Alderfer | B29C 44/1271 |
| | | | 264/278 |
| 3,116,739 A | 1/1964 | Andonie | |
| 3,121,977 A * | 2/1964 | Bersudsky | E04B 2/707 |
| | | | 428/47 |
| 3,147,176 A | 9/1964 | Haslam | |
| 3,152,716 A | 10/1964 | La Feldhahn | |
| 3,235,427 A * | 2/1966 | Koritz | H01F 1/06 |
| | | | 156/279 |
| 3,243,374 A * | 3/1966 | Gillard | C08K 3/24 |
| | | | 181/286 |
| 3,254,440 A | 6/1966 | Duggar | |
| 3,260,788 A | 7/1966 | Stetson | |
| 3,285,456 A | 11/1966 | Pewitt | |
| 3,292,328 A * | 12/1966 | Darling | E04B 2/82 |
| | | | 52/238.1 |
| 3,298,712 A | 1/1967 | Greenstadt | |
| 3,314,196 A | 4/1967 | Betz et al. | |
| 3,341,996 A * | 9/1967 | Jones | E04F 15/02144 |
| | | | 427/127 |
| 3,365,684 A | 1/1968 | Stemke et al. | |
| 3,378,974 A * | 4/1968 | Bush, Jr. | E04B 9/248 |
| | | | 428/47 |
| 3,384,934 A * | 5/1968 | Bush, Jr. | E04B 9/248 |
| | | | 24/303 |
| 3,456,373 A | 7/1969 | Epton | |
| 3,531,177 A | 9/1970 | Akin, Jr. | |
| 3,553,872 A | 1/1971 | Ebner | |
| 3,565,517 A | 2/1971 | Gitlin et al. | |
| 3,609,934 A * | 10/1971 | O'Carroll | E04F 13/0801 |
| | | | 428/900 |
| 3,629,756 A * | 12/1971 | Holtz | H01F 7/0215 |
| | | | 101/389.1 |
| 3,636,727 A | 1/1972 | Naughton | |
| 3,651,592 A | 3/1972 | McCormick et al. | |
| 3,712,846 A * | 1/1973 | Daniels et al. | E04B 1/86 |
| | | | 181/290 |
| 3,727,658 A | 4/1973 | Eldridge, Jr. | |
| 3,788,924 A * | 1/1974 | Kobayashi et al. | H01F 1/375 |
| | | | 156/178 |
| 3,852,935 A * | 12/1974 | Jones | E04B 2/7457 |
| | | | 52/238.1 |
| 3,864,881 A * | 2/1975 | Wolf | E04B 1/343 |
| | | | 49/142 |
| 3,876,034 A * | 4/1975 | Antonini | E04B 1/86 |
| | | | 181/208 |
| 3,882,637 A * | 5/1975 | Lindenschmidt | F25D 23/02 |
| | | | 29/451 |
| 3,897,288 A * | 7/1975 | Fayling | B23Q 3/1546 |
| | | | 156/289 |
| 3,897,928 A * | 8/1975 | Eisler | B28B 7/42 |
| | | | 249/78 |
| 3,902,940 A | 9/1975 | Heller, Jr. et al. | |
| 3,918,233 A * | 11/1975 | Simpson | E04B 7/105 |
| | | | 52/536 |
| 3,924,377 A | 12/1975 | Gill | |
| 3,935,361 A | 1/1976 | Dorfman et al. | |
| 3,943,912 A | 3/1976 | Nakayama | |
| 3,950,894 A | 4/1976 | DiMaio | |
| 3,965,599 A | 6/1976 | Ebner | |
| 3,969,572 A | 7/1976 | Rostek | |
| 3,987,567 A | 10/1976 | Fritts | |
| 4,023,651 A * | 5/1977 | Healiss | F16F 1/3605 |
| | | | 181/207 |
| 4,040,194 A | 8/1977 | Penton et al. | |
| 4,041,667 A * | 8/1977 | Lindner | E04B 2/7457 |
| | | | 52/241 |
| 4,154,226 A | 5/1979 | Hennig et al. | |
| 4,162,672 A | 7/1979 | Yazaki | |
| 4,187,187 A | 2/1980 | Turbeville | |
| 4,197,618 A | 4/1980 | Bourguignon | |
| 4,219,218 A | 8/1980 | Waldon | |
| 4,232,084 A * | 11/1980 | Tate | G09F 9/375 |
| | | | 428/321.5 |
| 4,234,378 A | 11/1980 | Iwasaki et al. | |
| 4,245,442 A * | 1/1981 | Durham | E04B 2/7455 |
| | | | 52/126.4 |
| 4,250,596 A * | 2/1981 | Hara | B29C 65/54 |
| | | | 156/278 |
| 4,272,942 A * | 6/1981 | Jackson | E06B 3/28 |
| | | | 428/900 |
| 4,294,485 A * | 10/1981 | Engelhard | B60P 3/32 |
| | | | 296/156 |
| 4,310,137 A | 1/1982 | Frye | |
| 4,342,904 A | 8/1982 | Onsager | |
| 4,364,208 A * | 12/1982 | Wilson | E04B 1/3211 |
| | | | 220/592.27 |
| 4,430,835 A * | 2/1984 | Ericson | B66B 11/0253 |
| | | | 24/306 |
| 4,462,193 A * | 7/1984 | Ericson | B66B 11/0253 |
| | | | 24/306 |
| 4,468,902 A * | 9/1984 | Wilson | E04B 1/3211 |
| | | | 52/249 |
| 4,473,980 A * | 10/1984 | Foster | E06B 3/28 |
| | | | 49/62 |
| 4,478,384 A | 10/1984 | Julseth | |
| 4,486,995 A * | 12/1984 | Allen | E04C 2/205 |
| | | | 428/461 |
| 4,561,223 A * | 12/1985 | Gold | E06B 3/28 |
| | | | 49/478.1 |
| 4,584,223 A | 4/1986 | Krapf | |
| 4,635,410 A * | 1/1987 | Chumbley | B44C 7/022 |
| | | | 160/378 |
| 4,640,808 A | 2/1987 | Okumura et al. | |
| 4,663,874 A * | 5/1987 | Sano | G09F 7/04 |
| | | | 40/600 |
| 4,673,542 A | 6/1987 | Wigner et al. | |
| 4,678,150 A | 7/1987 | Newman et al. | |
| 4,703,575 A | 11/1987 | Diamond | |
| 4,709,517 A * | 12/1987 | Mitchell | E04B 2/7412 |
| | | | 52/145 |
| 4,709,522 A * | 12/1987 | Carnahan | E04F 19/0436 |
| | | | 52/288.1 |
| 4,731,961 A * | 3/1988 | Bona | E04B 2/82 |
| | | | 135/142 |
| 4,735,284 A | 4/1988 | Gahlau et al. | |
| 4,769,166 A | 9/1988 | Harrison | |
| 4,800,662 A | 1/1989 | Belrose | |
| 4,810,015 A | 3/1989 | McNeil | |
| 4,832,396 A * | 5/1989 | Moreno | E05C 19/161 |
| | | | 296/164 |
| 4,833,018 A * | 5/1989 | Ruehl | B32B 11/08 |
| | | | 428/332 |
| 4,873,102 A | 10/1989 | Chang et al. | |
| 4,884,824 A | 12/1989 | Radke | |
| 4,934,119 A * | 6/1990 | Ybarra | E04B 2/7409 |
| | | | 52/238.1 |
| 4,941,236 A | 7/1990 | Sherman et al. | |
| 4,959,997 A | 10/1990 | Aisa et al. | |
| 4,961,849 A | 10/1990 | Hull et al. | |
| 5,009,625 A | 4/1991 | Longuet-Higgins | |
| 5,021,021 A | 6/1991 | Ballard | |
| 5,031,874 A | 7/1991 | Shannon | |
| 5,035,017 A | 7/1991 | Komuro | |
| 5,053,274 A * | 10/1991 | Jonas | C08K 3/0033 |
| | | | 428/332 |
| 5,077,948 A * | 1/1992 | Olson | B29C 33/16 |
| | | | 49/478.1 |
| 5,092,019 A | 3/1992 | Levy | |
| 5,127,652 A | 7/1992 | Unger | |
| 5,161,346 A * | 11/1992 | Olson | B29C 33/16 |
| | | | 156/272.4 |
| 5,238,721 A * | 8/1993 | Nakazawa | E04F 15/02 |
| | | | 156/299 |
| 5,267,763 A | 12/1993 | Klein | |
| 5,271,200 A * | 12/1993 | Witt | A47G 27/0475 |
| | | | 52/385 |
| D343,864 S | 2/1994 | Rebong | |

(56) References Cited

U.S. PATENT DOCUMENTS

| | | | |
|---|---|---|---|
| 5,295,342 A * | 3/1994 | Roche | G09F 7/04 40/600 |
| 5,342,665 A | 8/1994 | Krawitz | |
| 5,363,579 A * | 11/1994 | Plumly | G09F 7/04 40/600 |
| 5,384,999 A * | 1/1995 | Roche | G09F 7/04 40/600 |
| 5,447,790 A | 9/1995 | Funae et al. | |
| 5,452,508 A | 9/1995 | Wu | |
| 5,484,970 A * | 1/1996 | Suzuki | E04B 1/84 181/286 |
| 5,503,891 A | 4/1996 | Marshall et al. | |
| 5,534,097 A | 7/1996 | Fasano et al. | |
| 5,538,132 A | 7/1996 | Propp et al. | |
| 5,545,157 A | 8/1996 | Van Iten | |
| 5,622,504 A * | 4/1997 | Hance | G09B 29/001 434/421 |
| 5,709,053 A * | 1/1998 | Kuroda | B29B 17/0026 181/284 |
| 5,778,580 A * | 7/1998 | Zarelius | G09F 15/0062 160/351 |
| 5,800,896 A | 9/1998 | Kobayashi | |
| 5,806,346 A | 9/1998 | Schlinger et al. | |
| 5,832,831 A | 11/1998 | Boyle et al. | |
| 5,833,795 A | 11/1998 | Smith et al. | |
| 5,847,316 A * | 12/1998 | Takada | H05K 9/0001 174/374 |
| 5,852,890 A | 12/1998 | Pynenburg | |
| 5,891,315 A | 4/1999 | Nash | |
| 5,919,540 A * | 7/1999 | Bailey | B32B 3/266 15/217 |
| 5,919,541 A | 7/1999 | Emory | |
| 5,927,033 A * | 7/1999 | Kreckl | E04F 13/0883 156/310 |
| 5,974,753 A * | 11/1999 | Hsu | E04F 13/0862 52/287.1 |
| 5,984,043 A | 11/1999 | Ruhe et al. | |
| 5,984,855 A | 11/1999 | DiNapoli | |
| 6,042,057 A | 3/2000 | Rice | |
| 6,062,688 A | 5/2000 | Vinas | |
| 6,090,478 A * | 7/2000 | Nishizaki | B32B 5/02 428/297.4 |
| 6,113,142 A | 9/2000 | Tolbert | |
| 6,122,955 A | 9/2000 | Hoog et al. | |
| 6,305,656 B1 | 10/2001 | Wemyss | |
| 6,318,569 B1 * | 11/2001 | Rothing | A47B 96/027 108/152 |
| 6,344,021 B1 | 2/2002 | Juster et al. | |
| 6,367,126 B1 | 4/2002 | Rivkin | |
| 6,406,418 B1 | 6/2002 | Getek | |
| 6,406,783 B1 | 6/2002 | Phillips et al. | |
| 6,455,146 B1 * | 9/2002 | Fitzgerald | B32B 3/00 156/83 |
| 6,484,428 B1 | 11/2002 | Greenwald et al. | |
| 6,502,933 B2 | 1/2003 | Lim et al. | |
| 6,553,724 B1 | 4/2003 | Bigler | |
| 6,575,328 B1 | 6/2003 | Foraker | |
| 6,599,419 B2 | 7/2003 | Hagans | |
| 6,620,464 B2 * | 9/2003 | Sciandra | E04F 21/04 427/127 |
| 6,632,168 B2 | 10/2003 | Roberts et al. | |
| 6,663,128 B1 | 12/2003 | Dichter | |
| 6,668,504 B2 * | 12/2003 | Hughart | E04B 2/7457 181/284 |
| 6,673,258 B2 | 1/2004 | Purizhansky | |
| 6,701,677 B2 * | 3/2004 | Gresham | E04B 2/7422 52/220.7 |
| 6,774,066 B1 * | 8/2004 | Souza | B32B 15/04 138/99 |
| 6,821,573 B1 * | 11/2004 | Paping | B60Q 7/00 116/28 R |
| 6,846,379 B1 | 1/2005 | Bove et al. | |
| 6,857,809 B2 | 2/2005 | Granata | |
| 6,889,457 B2 | 5/2005 | Boddie | |
| 6,897,752 B2 | 5/2005 | Dixon et al. | |
| 6,953,105 B2 * | 10/2005 | Rust | B32B 7/14 181/286 |
| 7,063,878 B1 | 6/2006 | Poulakis | |
| 7,125,595 B2 * | 10/2006 | Kobayashi | A47L 23/266 428/101 |
| 7,153,113 B2 | 12/2006 | Graham et al. | |
| 7,187,261 B2 | 3/2007 | Cassar | |
| 7,275,334 B2 | 10/2007 | Horst | |
| 7,307,501 B2 | 12/2007 | Doi | |
| 7,332,101 B2 | 2/2008 | Singh et al. | |
| 7,461,750 B2 | 12/2008 | Armstrong | |
| 7,469,869 B2 | 12/2008 | Killion | |
| 7,503,136 B1 | 3/2009 | McDonald | |
| 7,510,092 B2 * | 3/2009 | Sholem | B25H 3/04 211/70.6 |
| 7,641,534 B2 | 1/2010 | Holman | |
| 7,694,440 B1 | 4/2010 | Wu | |
| 7,740,215 B2 | 6/2010 | Lang | |
| 7,772,504 B1 | 8/2010 | Tashjian | |
| 7,992,265 B2 | 8/2011 | Suenaga | |
| 8,079,568 B2 | 12/2011 | Heinrich et al. | |
| 8,152,709 B2 | 4/2012 | Szeto | |
| 8,261,736 B1 * | 9/2012 | Olivarri | A47G 5/04 126/545 |
| 8,307,600 B2 | 11/2012 | Heartsfield | |
| 8,366,283 B2 | 2/2013 | Sierra | |
| 8,376,409 B2 | 2/2013 | Rosset | |
| 8,408,627 B2 | 4/2013 | Mann | |
| 8,458,863 B2 | 6/2013 | Hunts | |
| 8,613,881 B2 | 12/2013 | Soong | |
| 8,656,674 B1 * | 2/2014 | Woodward | E04F 13/0883 52/388 |
| 8,684,783 B2 | 4/2014 | Ehrsam | |
| 8,689,464 B2 | 4/2014 | Rodman et al. | |
| 8,727,404 B2 | 5/2014 | Martin | |
| 8,734,669 B2 | 5/2014 | Tomiyama et al. | |
| 8,757,698 B1 * | 6/2014 | Rowland | B60N 3/044 296/97.23 |
| 8,785,623 B2 | 7/2014 | Olsson et al. | |
| 8,943,723 B2 | 2/2015 | Valentine et al. | |
| 8,999,478 B1 * | 4/2015 | Medlen | E06B 3/7001 428/99 |
| 9,140,017 B1 * | 9/2015 | Oliver | E04F 13/075 |
| 9,251,458 B2 | 2/2016 | Finn et al. | |
| 9,271,586 B2 | 3/2016 | Ryan | |
| 2002/0078612 A1 * | 6/2002 | Meacham | G09F 7/04 40/711 |
| 2002/0130231 A1 * | 9/2002 | Winnard | B25H 3/04 248/206.5 |
| 2002/0160231 A1 * | 10/2002 | Schneider | G11B 5/70 428/843 |
| 2003/0077465 A1 * | 4/2003 | Boudouris | B32B 27/18 428/469 |
| 2003/0180499 A1 * | 9/2003 | Kobayashi | A47L 23/266 428/95 |
| 2004/0006902 A1 * | 1/2004 | Zarelius | G09F 15/00 40/600 |
| 2004/0006903 A1 | 1/2004 | Haytas | |
| 2004/0053002 A1 * | 3/2004 | Kobayashi | A47L 23/266 428/95 |
| 2004/0093811 A1 * | 5/2004 | Oakey | A47G 27/025 52/177 |
| 2004/0231212 A1 * | 11/2004 | Roche | B32B 3/06 40/600 |
| 2005/0064242 A1 * | 3/2005 | Schneider | G11B 5/70 428/839 |
| 2005/0170739 A1 | 8/2005 | Zoellner | |
| 2005/0246971 A1 * | 11/2005 | Ortega | E04D 5/145 52/90.1 |
| 2005/0276982 A1 * | 12/2005 | Manchee | B32B 9/02 428/411.1 |
| 2006/0198977 A1 * | 9/2006 | Meservey | B32B 33/00 428/40.1 |
| 2007/0114812 A1 * | 5/2007 | Hunt | B60R 13/08 296/181.6 |

(56) References Cited

U.S. PATENT DOCUMENTS

| | | | |
|---|---|---|---|
| 2007/0119804 A1* | 5/2007 | Antonioni | A47F 5/0807 211/86.01 |
| 2007/0241071 A1* | 10/2007 | Antonioni | A47F 5/0807 211/87.01 |
| 2008/0092731 A1* | 4/2008 | Hall | B29C 70/086 89/36.04 |
| 2008/0166508 A1* | 7/2008 | Edwards | B29C 44/3411 428/34.1 |
| 2008/0202053 A1* | 8/2008 | Guy | E04F 15/02144 52/391 |
| 2008/0236052 A1* | 10/2008 | Fleming | E04B 1/803 52/2.22 |
| 2008/0282632 A1* | 11/2008 | Sleeman | B32B 27/06 52/309.1 |
| 2008/0302049 A1* | 12/2008 | Stoneburner | B60R 13/08 52/506.02 |
| 2009/0044460 A1* | 2/2009 | Medley | E04B 1/3444 52/71 |
| 2009/0044485 A1* | 2/2009 | Carolan | E04D 3/28 52/800.1 |
| 2009/0133342 A1* | 5/2009 | Copeland | E04B 9/003 52/202 |
| 2009/0205280 A1* | 8/2009 | Coppersmith | E04B 1/803 52/506.01 |
| 2009/0230068 A1* | 9/2009 | Wang | A47B 47/00 211/134 |
| 2009/0250574 A1* | 10/2009 | Fullerton | G09F 7/04 248/206.5 |
| 2009/0250575 A1* | 10/2009 | Fullerton | G09F 7/04 248/206.5 |
| 2010/0095953 A1* | 4/2010 | Husted | F24B 1/191 126/500 |
| 2010/0276382 A1* | 11/2010 | Antonioni | A47F 5/0807 211/59.2 |
| 2010/0290212 A1 | 11/2010 | Francis | |
| 2010/0326336 A1* | 12/2010 | Struthers | B32B 13/12 109/78 |
| 2011/0083254 A1 | 4/2011 | Trutna et al. | |
| 2011/0115355 A1* | 5/2011 | Heckler | A47L 15/4257 312/405 |
| 2011/0174953 A1 | 7/2011 | Ruiz et al. | |
| 2011/0236621 A1* | 9/2011 | Sampson | B32B 7/045 428/99 |
| 2011/0283627 A1 | 11/2011 | Shaw | |
| 2012/0103177 A1* | 5/2012 | Coltrane | B60F 3/0038 89/36.02 |
| 2012/0143165 A1 | 6/2012 | Macura et al. | |
| 2012/0189810 A1* | 7/2012 | Whitener | B05D 3/12 428/141 |
| 2012/0279157 A1* | 11/2012 | Sha | E04F 13/0883 52/578 |
| 2013/0032310 A1* | 2/2013 | Jaena | F28D 15/02 165/104.25 |
| 2013/0061431 A1 | 3/2013 | Naftali et al. | |
| 2013/0067819 A1* | 3/2013 | McLain | E06B 5/01 49/463 |
| 2013/0111840 A1* | 5/2013 | Bordener | E04B 1/68 52/393 |
| 2013/0167474 A1* | 7/2013 | Carlson | F25D 23/028 52/784.15 |
| 2013/0222091 A1* | 8/2013 | Fullerton | H01F 7/0257 335/295 |
| 2014/0054434 A1 | 2/2014 | Chen | |
| 2014/0090312 A1* | 4/2014 | Medley | E04B 1/34357 52/79.5 |
| 2014/0096467 A1* | 4/2014 | Norton | E04F 13/0833 52/582.2 |
| 2014/0137450 A1 | 5/2014 | Knez | |
| 2014/0227934 A1 | 8/2014 | Rudiseill | |
| 2014/0302772 A1* | 10/2014 | Nizich | F24F 13/06 454/334 |
| 2015/0020468 A1* | 1/2015 | Wickstrom | E04F 13/0816 52/274 |
| 2015/0048097 A1* | 2/2015 | Jeffries | B65D 90/06 220/592.25 |
| 2015/0367245 A1 | 12/2015 | Ahn et al. | |
| 2016/0001093 A1 | 1/2016 | Wulfcrona et al. | |
| 2016/0198782 A1 | 7/2016 | Thompson | |
| 2016/0242504 A1 | 8/2016 | Cowley et al. | |
| 2016/0354495 A1 | 12/2016 | Harmer et al. | |

* cited by examiner

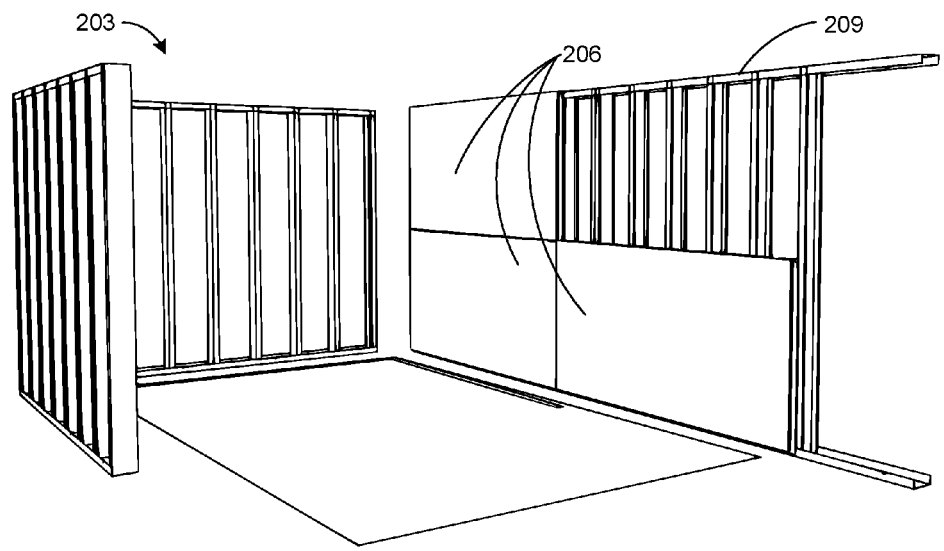
FIG. 2A
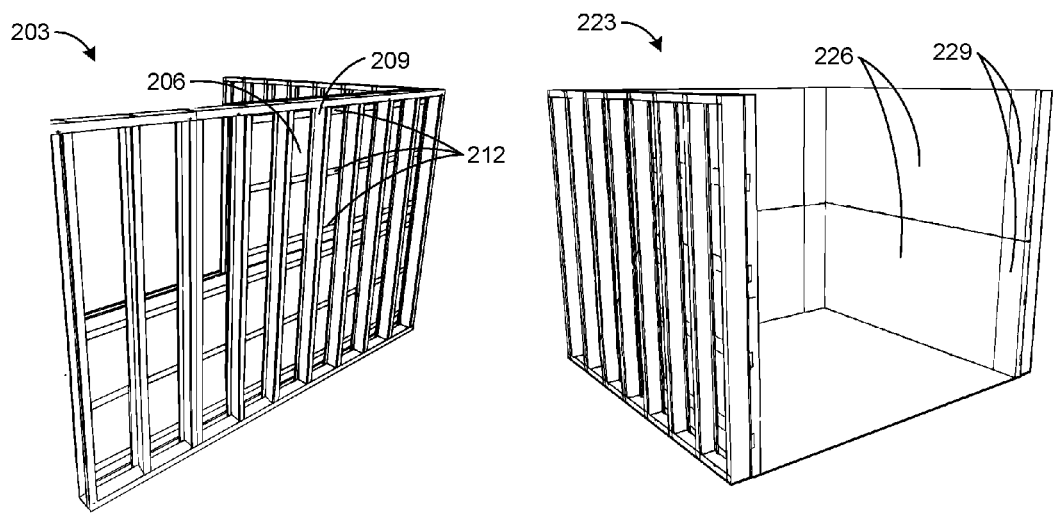
FIG. 2B  FIG. 2C

MAGNETIC CLASPS FOR INSULATION

CROSS-REFERENCE TO RELATED APPLICATIONS

This application claims the benefit of U.S. Provisional Application No. 62/202,114, filed Aug. 6, 2015, the entire contents of which are hereby incorporated herein by reference.

BACKGROUND

Insulation may be used for many different purposes. Where high or low environmental temperatures may occur, insulation may protect objects from condensation, freezing, melting, expansion, contraction, and other effects. Energy may be saved by using insulation to maintain temperature. Insulation can also serve to control noise, protect from physical damage, and for other purposes.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIGS. 2A and 2B illustrate perspective views of an example structure utilizing panels having magnetic clasps according to an embodiment.

FIG. 2C illustrates a perspective view of another example structure utilizing panels having magnetic clasps according to an embodiment.

DEFINED DESCRIPTION

Figure 1A:
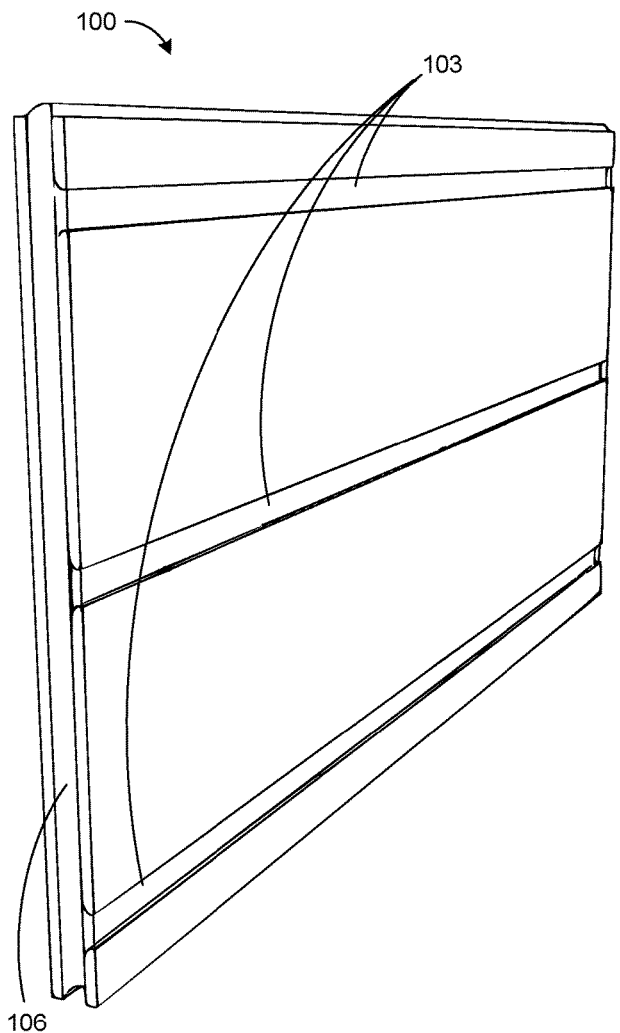
FIG. 1A illustrates a perspective view of an example of insulation having magnetic clasps according to an embodiment.

Magnetic closures for insulation or other materials are disclosed herein. The term magnetic material can include any material capable of producing a magnetic field such as, for example, ferromagnetic materials, and can be anisotropically or isotropically charged. As used herein, the term magnetic clasp can refer to any object that can be used in conjunction with another object to hold something together or to hold or attach something via a magnetic field. For example, a magnetic clasp that is magnetized can be attracted to another magnetic clasp that is also magnetized. Alternatively, a magnetic clasp can produce an attraction with a clasp that is not itself magnetized. Also, a magnetic clasp can be attracted to other objects or materials for attachment to ferrous or ferromagnetic materials or structures that can be magnetized or unmagnetized.

In some embodiments, the magnetic material described herein can incorporate materials compatible with insulation materials, for example, magnetic material can be made of 80% ferromagnetic material (e.g., neodymium, or others) and 20% insulation material (e.g., polyurea, or others), or other ratios. A magnetic material mixture including ferromagnetic material and insulation material can make a physically resilient or tough magnet that can bond well with materials similar or compatible to the insulation material. In further embodiments, the magnetic material can include other insulation materials, other ferromagnetic materials or ferromagnetic ores, and in different proportions. The magnetic materials described herein can alternatively not include any insulation material(s). A magnetic clasp can have magnetic component(s) as well as non-magnetic component(s), for example, an attachment component, to aid a connection, attachment, or bond to insulation or other materials.

An insulation component can, for example, be formed of polyisocyanurate or other material suitable for the application. For example, an insulation component can be chosen for temperature insulation sound insulation, physical protection or resilience, armor, flexibility, among other properties. Polystyrene, polyethylene, polyolefin, polyurethane, polyisocyanurate, polymide, phenolic foams, elastomeric foams, cellular glass, silica aerogel, mineral fiber, high temperature fiber, perlite, microporous, granular, calcium silicate, textile glass, melamine, polyurea, fiberglass, PVC jacket, PVDC film, metal rolls and sheets, and other insulation materials can also be used along with the magnetic materials, components, and closures described herein.

Some embodiments provide for strong bonds between the magnetic component and the insulation component, allowing strong magnetic force to be used. For example, in one embodiment, the magnetic components of magnetic insulation can include neodymium and polyurea. This mixture (e.g., about 80% neodymium and 20% polyurea, or other ratios) is formed and pressed into strips. In other embodiments, the mixture can include polyurea and iron. Further embodiments can include aramid or para-aramid synthetic fiber and ferromagnetic material. This embodiment can be used for physically strong, armor-type insulation applications. The magnetic components for magnetic insulation can be made in any shape using forms of various shapes. Magnetic components can refer to strips of magnetic material, or can refer to any discrete shape.

The mixture forming a magnetic component can be poured into a mold to form the component in the mold. In some embodiments, the mold can form the mixture, at least in part, to include a fin, wedge, arrow, or other shape or form. Another material (or the same mixture) can be poured into the same mold to form a magnetic clasp. In some cases, the mixture is not completely cured before the next layer is poured, extruded, calendared, or otherwise attached to the magnetic component. In further embodiments, a fin, wedge, arrow, barb, or other shape can be attached thereafter using mechanical attachment, interference, friction, glue, epoxy, or other methods.

The magnetic component, with or without a fin, wedge, arrow, or other shape, can be attached or connected to insulation, such as a sheet, board or panel of insulation. The insulation can be formed by pouring, extruding, etc. in connection with the magnetic component. In some cases, the material or mixture comprising the magnetic component is not completely cured before the insulation is poured, extruded, calendared, or otherwise attached to the magnetic component or clasp.

The magnetic material or mixture can be chosen to match the composition of insulation to be held with the magnetic clasp. This can allow for a strong bond between the magnetic material of the magnetic component of the clasp to the insulation material. In some embodiments, the magnetic material or mixture chosen includes a material similar to or the same as the insulation material. In other embodiments, any materials that allow for a strong or solid bond can be used. Where a non-magnetic fin, arrow, trapezoid, wedge, or other shape is connected to the magnetic component, the non-magnetic material can also be chosen for its ability to bond well with the other materials in use.

Embodiments of the magnetic clasping components can be formed from a base material, including but not limited to: Polyurea, Elastomeric, Cellular Glass, Polystyrene, Polyisocyanurate, Polyurethane, or any of the other insulation materials discussed herein. Other materials can also be used to make the compatible magnetic materials and the additional structure. These and other materials are mixed with the ferromagnetic material at the point of manufacture in a high ratio (e.g., 30-80%) by weight, forming a magnetic material.

In one embodiment, the ferromagnetic material and a resin blend formulation which consists of various amine terminated molecules of varying sizes and type is mixed with a shear mixer. Next, polyisocyanate pre-polymer is mixed in. The quickly setting mix is a slurry that is pressed into a mold. The slurry sets into the magnetic component. One or more of these base materials as listed above are mixed in a similar fashion as described for polyurea with a magnetizable ore or a magnetizable substance at the point of manufacturing the component to be clasped (e.g., pipe insulation, sheets or others) making the magnetic clasping system incorporated into the manufacturing process. In some embodiments, the magnetic clasping system may be affixed after the components to be clasped are manufactured and installed with glue, friction, or other methods.

The magnetized clasping system involves an embedded magnetic or magnetically attractive material (i.e., ferrous) into clasps, pipe insulation, sheet insulation, and other materials, in a manner that is secure and non-destructive. The parts may be clasped and un-clasped without damage to the parts being clasped. This is accomplished by making the magnetic component described above and in many embodiments, joining the magnetic component with an additional structure (like a fin) so that the magnetic clasps are structurally compatible with the insulation material or other material to be clasped, and have a strong or nearly inseparable bond the insulation material or other material to be clasped. This magnetic material mix comprising the insulation (or other) material can bond well with purer forms of the insulation (or other) materials. The magnetic material can be altered or designed to suit the application. The shape and form of the magnets or magnetic clasps embedded into the insulation material or other material to be clasped can also be designed or chosen as desired to suit the application.

Magnetic sheets or boards of insulation can be used for a variety of purposes, and can be made separately such that it can be attached to a variety of surfaces and various structures. Magnetic sheets or boards of insulation can also be made in more than one piece. In some embodiments, magnetic sheets or boards of insulation can be made to fit together, for example, by making complementary shapes at edges of the sheets or boards. In one embodiment, a top edge of a magnetic insulation sheet can have a shape that is complementary to a bottom edge of another magnetic insulation sheet to be placed above and adjacent to the insulation sheet. To this end, in some embodiments, a top edge of a magnetic sheet of insulation can have a shape that is complementary to a shape of its own bottom edge. In this case, many sheets having substantially the same shape can fit together top-to-bottom. Likewise, each edge of a sheet can be designed to be complementary to opposite edges (e.g. top-to-bottom, and left-to-right). For example, a tongue and groove, ship lap, butt joint, or other types of designs can be utilized.

In other embodiments, edge shapes can be more specifically designed to fit with other specifically designed edge shapes of a magnetic sheet or board of insulation. For example, sheet edges that are designed to be a bottom piece can have a flat or otherwise specifically designed edge, and sheet edges that are designed to be a top piece can have another specifically designed edge, and so on. A magnetic sheet of insulation can be substantially square, or can be triangular, pentagonal, hexagonal, or other shapes. Multiple different shapes can be designed to fit together for a particular application. Also, in some embodiments, magnetic sheets or boards can be rigid, and in other embodiments, they can be flexible or rollable. In some embodiments, the magnetic sheets can be cut to fit a particular size or application, while maintaining their magnetic properties. To this end, magnetic strips can be designed to be able to be cut and maintain their magnetic properties, for example, by pole alignment in the magnetic strips. In other embodiments, a plurality of segmented strips or a plurality of magnetic clasps can be used, and the magnetic sheets can be cut between the segments, clasps, or strips.

A number of magnetic sheets or boards of insulation can be assembled into a larger shape. For example, magnetic sheets or boards of insulation that are rectangular in shape can be assembled into a larger rectangular shape. The magnetic properties of the magnetic sheets or boards can be achieved by attaching a magnetic clasp or magnetic clasping system to a sheet or board of insulation.

In one embodiment a magnetic clasping system can be installed on sheets of insulation. The sheets or boards of magnetic insulation can be assembled to insulate a walk-in cooler or other structure. The sheets of boards of magnetic insulation can be attached to a skeleton structure of ferrous materials (e.g., steel studs or other metallic structural components) to form walls of the structure. In other embodiments, the sheets of boards of magnetic insulation can be attached to existing walls of the structure. This can maintain a temperature within the structure, or provide insulation between the interior of the structure and exterior of the structure, as desired. In some embodiments magnetic clasps can also be attached to a structure to mate with magnetic clasps of magnetic insulation sheets or boards.

The magnetic clasps for magnetic insulation sheets or boards can comprise an insulation-compatible substance and magnetic material. These magnetic clasps can be attached to or incorporated into sheets of insulation to form magnetic insulation sheets or boards. In different embodiments the sheets can be insulated or not insulated. The magnetic clasping system can be used to create temporary structures or used permanently. A magnetic clasp can have a magnetized strip or other shape of magnetic component, and can be shaped or designed to prevent the magnetic strip from coming out or tearing loose from the sheet or board. The depth of the insertion of the magnetized component can vary. The shape of the magnetized components can vary. For example, a magnetized component can comprise a beveled shape, a tail, a barb, an arrowhead, or other shape to aid its attachment to the insulation sheet or board.

In some embodiments the magnetized component can, be attached to another component, such as an attachment component in the form of a barb, an arrowhead, a beveled shape, or another shape of material to aid its attachment to the insulation sheet or board. These shapes of material can be used to securely attach the magnetized clasp comprising the magnetized strip and the other shape of material to the insulation sheet or board. In other embodiments, the magnetic components can be attached to the insulation as a magnetic clasp without a tail, barb, arrowhead, or other shape designed to aid its attachment.

Turning now to the drawings, various structural and functional aspects of the embodiments are described in further detail. It should be appreciated that the drawings are illustrative of examples. Further devices may look substantially different, while incorporating the principles described herein.

FIG. 1A illustrates a perspective view of an example of a sheet, board, or panel of magnetic insulation 100 having magnetic clasps 103 according to one embodiment. In this embodiment the length of each magnetic clasp 103 runs laterally for most of the length of the magnetic insulation 100, or substantially the length of the magnetic insulation. In other embodiments, the magnetic clasps can be oriented otherwise, for example vertically, or diagonally, or each magnetic clasp can have a different orientation.

While the length of each magnetic clasp runs substantially the length of the magnetic insulation 100, in other embodiments, the magnetic clasps can be segmented into short pieces of similar or varying shape(s), run half the length, a quarter length, or another fraction of the length of the magnetic insulation 100. Further, the magnetic clasps can instead be discrete shapes, for example such as circles of magnetic material attached at various locations substantially flush with the face of the magnetic insulation 100. In some embodiments the magnetic clasps are offset from the face of the magnetic insulation, but can have a face of the magnetic clasp that is substantially parallel to the face of the magnetic insulation.

The magnetic insulation 100 can also be called a magnetic insulation sheet, magnetic insulation board, or magnetic insulation panel. It should be appreciated that the magnetic insulation 100 and magnetic clasps illustrated in FIG. 1A are provided by way of example only. In other words, the embodiments of magnetic clasps for magnetic insulation described herein may vary in size, shape, and form, and can be used for insulating many types of assemblies, structures, etc.

The embodiment shown in FIG. 1A is representative and not intended to be limiting of the embodiments.

The magnetic insulation 100 is substantially rectangular in shape. Other embodiments can have other shapes. The rectangular magnetic insulation 100 has four edges, a top edge, a bottom edge, a left edge and a right edge, as shown. These descriptors are used for descriptive convenience, but the magnetic insulation 100 can be oriented otherwise such that these edges are in a different location than shown. The magnetic insulation 100 has magnetic clasps 103 on one face of the magnetic insulation. Other embodiments can have magnetic clasps on both faces of the magnetic insulation 100.

The magnetic insulation 100 has tongue and groove-type edges. For example, the groove edge 106, corresponding to the left edge of the magnetic insulation 100. While not visible, the right edge of the magnetic insulation can have a complementary shape, such as a tongue-shaped edge. The top edge of the magnetic insulation 100 is shown having a tongue edge. The bottom edge of the magnetic insulation 100 is shown having a groove edge. The groove edge can be designed to receive the tongue edge. While the tongue and groove edges of the magnetic insulation 100 are shown as curved, they can also be ridged or a more complex shape. In some embodiments, the edges can interlock. In some embodiments, the tongues and grooves, or edges having complementary shapes, can be coated to provide greater friction between them. Other surfaces of the panels, boards, or sheets can also be coated to provide greater friction.

Figure 1B:
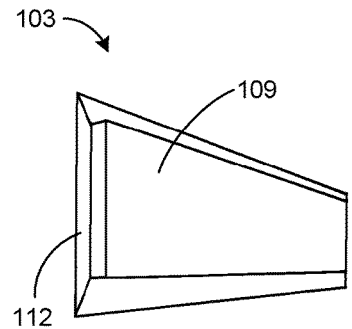
FIG. 1B illustrates a perspective view of an example magnetic clasp that can be used in the insulation shown in FIG. 1A according to an embodiment.

FIG. 1B illustrates a larger perspective view of one of the magnetic clasps 103 of FIG. 1A. The magnetic clasp 103 has a magnetic strip 109 and a back panel 112 attached to the magnetic strip 109. The magnetic strip 109 can be a magnetic material. The wedge 112 can also be called a tail, or a shape of material attached to the magnetic strip 109. The wedge 112 can be described as having a trapezoidal, beveled, or wedge shape. Other shapes, such as a barb, an arrow, or other shape can be used instead of the wedge shape of the wedge 112. The wedge shape or other shape can help to securely hold the magnetic clasp 103 to the magnetic insulation 100.

In some embodiments, the magnetic clasp 103 can be formed in a mold. For example, a magnetized slurry can be poured in the mold to form the magnetic strip 109, and then another layer is poured in the mold to form the wedge 112 securely attached to the magnetic strip 109. In other embodiments, the magnetic strip 109 can be formed in a first mold, and can be placed in another mold to form the wedge 112 attached to the magnetic strip 109. The wedge 112 can be any material that can make a secure connection with the magnetic clasp 103. In further embodiments, the magnetic clasp 103 can be formed in other ways, and the magnetic strip 109 can be attached to the wedge 112, for example, using glue, epoxy, other adhesive, or other material. While the magnetic strip 109 is described as a strip, in other embodiments the magnetic strip 109 can be replaced with a magnetic component or plurality of magnetic components having individual or discrete shapes.

Figure 1C:
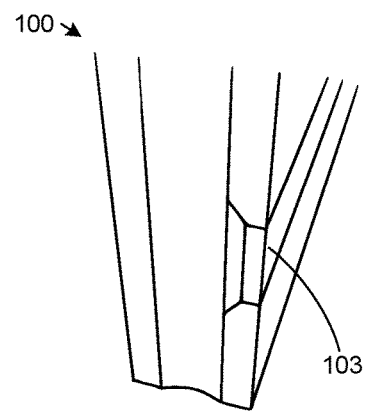
FIG. 1C illustrates a magnified perspective view of the example of insulation having magnetic clasps shown in FIG. 1A according to an embodiment.

FIG. 1C illustrates a larger perspective view of one of the magnetic clasps 103 of FIG. 1A attached to the insulation panel of the magnetic insulation 100. This view further shows that the wedge 112 can be used to hold the magnetic clasp 103 having the magnetic strip 109 to the insulation panel of the magnetic insulation 100, for example, to increase the pull-out force. The magnetic clasp 103 can be held to the magnetic insulation 100 by mechanical interference or friction upon insertion into insulation. In other embodiments, the magnetic clasp(s) 103 can be placed in a mold and an insulation material can be poured or injected into the mold with the magnetic clasps 103. In further embodiments, the magnetic clasps 103 can also be attached to the magnetic insulation 100 using glue, epoxy, other adhesive, or other material.

Figure 1D:
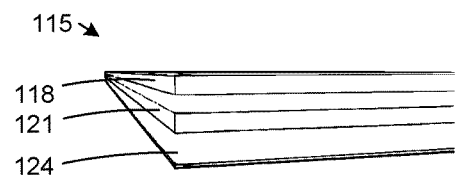
FIG. 1D illustrates an exploded perspective view of an example of a magnetic clasp according to an embodiment.

FIG. 1D illustrates a magnetic clasp 115. The magnetic clasp 115 has three layers or components, including an attachment layer 118, a magnetic layer 121, and a facing layer 124. In this embodiment, the magnetic layer 118 is mixed with polyurea where the ferromagnetic material or ore is 80% by weight. Other mixtures can be used. After this mixture is formed, the attachment layer 118 is added. The attachment layer has a material compatible with the magnetic layer, for example, the same mixture or another mixture having the same materials (e.g., 50% polyurea, 50% ferromagnetic material). The attachment layer (or component) can also comprise completely different material(s) than the magnetic component and/or the insulation. The attachment layer can be flat as shown, or can have a beveled shape, a trapezoidal shape, a wedge shape, an arrow shape, a barbed shape, or other shape for attachment to insulation or other material. The facing layer 124 can be thin, and can be used for the protection of the magnetic layer 121. In one embodiment, the facing layer can be a foil or a sheet metal.

FIG. 2A illustrates a structure 203 utilizing magnetic insulation panels 206. Each of the magnetic insulation panels 206 can be substantially similar to the magnetic insulation 100 of FIG. 1A. The structure 203 can be a walk-in cooler, a sound recording room, or another kind of room. To this end, the insulation of the insulation panels 206 can be chosen for sound insulation, temperature insulation, or other purposes. The structure 203 can be illustrative of any kind of structure in which the magnetic insulation panels 206 are utilized.

The structure 203 has a number of wall frame structures, including the wall frame structure 209. The wall frame structure 209 can have metal studs, or studs having a ferrous or magnetic material. In other embodiments, the studs can be non-magnetic material and can have magnetic clasps or other magnetic material attached to them, or can have a wall attached to the studs of the wall frame that is ferrous or magnetic, or has ferrous or magnetic clasps. The magnetic insulation panels 206 can be attached magnetically to the ferrous or magnetic studs of the wall frame structure 209. The magnetic insulation panels 206 can interlock using tongue and groove shaped edges of the magnetic insulation panels 206, as described previously. As shown, a front face of the magnetic insulation panels 206 can be seen. The front face of each of the magnetic insulation panels 206 is shown having an insulation material, and no magnetic clasps. In other embodiments, the front face of each of the magnetic insulation panels 206 can have magnetic clasps. While not seen, the back face of each of the magnetic insulation panels 206 can have magnetic clasps to hold the magnetic insulation panels 206 to the wall frame structure 209. A lateral magnetic strip can allow for a wide variety of lateral placements for each magnetic insulation panel on the, as the magnetic strip need not have the same spacing as the vertical studs. Diagonal strips can have similar effects. However, as discussed, magnetic clasps can be long or short strips, or any discrete shape, and a plurality of such clasps can be placed anywhere on a face of a magnetic insulation panel.

FIG. 2B illustrates another perspective view of the structure 203 of FIG. 2A. This view shows another side of the wall frame structure 209 than is shown in FIG. 2A. From this view, the back face of each of the magnetic insulation panels 206 is shown having magnetic clasps 212 to hold the magnetic insulation panels 206 to the wall frame structure 209.

FIG. 2C illustrates a perspective view of another structure 223. The structure 223 has magnetic insulation panels 226 and 229. The magnetic insulation panels 226 and 229 are different sizes, the panels 226 being much larger and the panels 229 being much smaller. In some embodiments, the panels 226 can be cut from the panels 229. To this end, the magnetic clasps (not shown) on the back of the panels can be designed to be cut and retain their magnetic properties, or a pattern of magnetic clasps can be used and the panel can be cut between magnetic clasps.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. Insulation comprising:
   a panel having a face and a plurality of edges, the panel comprising polyisocyanurate;
   a magnetic strip set in the panel that extends across a length of the panel, wherein a face of the magnetic strip is flush with the face of the panel, and the magnetic strip comprises a ferromagnetic material and polyurea;
   a wedge that extends along the magnetic strip between the magnetic strip and the panel to aid attachment of the magnetic strip to the panel, wherein the wedge has a trapezoidal cross section, a top of the wedge is attached to the magnetic strip and a base of the wedge is wider than the magnetic strip; and
   an edge of the panel comprising a first shape that interlocks with a second shape of an edge of another panel, each of the first shape and the second shape being part of a tongue-and-groove or a ship-lap design.

2. The insulation of claim 1, wherein the wedge comprises the ferromagnetic material and polyurea.

3. The insulation of claim 2, wherein the wedge and the magnetic strip comprise a same ratio of the ferromagnetic material and polyurea.

4. The insulation of claim 2, wherein the wedge and the magnetic strip comprise different ratios of the ferromagnetic material and polyurea.

5. The insulation of claim 1, wherein the magnetic strip comprises 30-80% of the ferromagnetic material and 20-70% of polyurea.

6. The insulation of claim 1, wherein the face of the magnetic strip is covered by a layer of foil.

7. The insulation of claim 1, wherein the magnetic strip is parallel to a first edge of the plurality of edges of the panel.

8. The insulation of claim 1, wherein the ferromagnetic material is neodymium.

9. The insulation of claim 1, wherein the panel is one of a plurality of panels assembled edge-to-edge on a structure comprising at least one ferromagnetic material, the one of the plurality of panels being magnetically held to the structure using at least the magnetic strip.

10. An apparatus comprising:
    a panel comprising an insulation material;
    a magnetic clasp that is attached to the panel, the magnetic clasp comprising a plurality of layers;
    a first layer of the plurality of layers of the magnetic clasp, the first layer being a magnetic strip that is flush with a first face of the panel and extends across a length of the panel, wherein the first layer comprises polyurea and neodymium;
    a second layer that is attached to the first layer and the panel, and is embedded in the panel, the second layer comprising a trapezoidal cross section, a top of the second layer being attached to the magnetic strip and a base of the second layer being wider than the magnetic strip, wherein the second layer comprises polyurea; and
    an edge of the panel comprising a tongue-and-groove or a ship-lap design, wherein the edge of the panel is complementary with another edge of another panel.

11. The apparatus of claim 10, wherein the insulation material comprises at least one of polyisocyanurate, polystyrene, polyethylene, polyolefin, polyurethane, or polyurea.

12. The apparatus of claim 10, wherein the first layer is not completely cured when the first layer is attached to the second layer.

13. The apparatus of claim 10, wherein the second layer further comprises neodymium.

14. The apparatus of claim 13, wherein the first layer and the second layer comprise a same ratio of polyurea and neodymium.

15. The apparatus of claim 13, wherein the first layer and the second layer comprise different ratios of polyurea and neodymium.

16. The apparatus of claim 10, wherein the panel is one of a plurality of panels assembled edge-to-edge on a structure comprising at least one ferromagnetic material, the one of the plurality of panels being magnetically held to the structure using at least the magnetic clasp.

\* \* \* \* \*